United States Patent
Bigioi et al.

(10) Patent No.: US 10,713,186 B2
(45) Date of Patent: Jul. 14, 2020

(54) PERIPHERAL PROCESSING DEVICE

(71) Applicant: FotoNation Limited, Galway (IE)

(72) Inventors: Petronel Bigioi, Galway (IE); Corneliu Zaharia, Brasov (RO)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/118,314

(22) Filed: Aug. 30, 2018

(65) Prior Publication Data

US 2019/0065410 A1 Feb. 28, 2019

Related U.S. Application Data (60) Provisional application No. 62/552,592, filed on Aug. 31, 2017, provisional application No. 62/592,665, filed on Nov. 30, 2017.

(51) Int. Cl.
*G06F 3/06* (2006.01)
*G06N 3/06* (2006.01)
(Continued)

(52) U.S. Cl.
CPC ........ *G06F 13/102* (2013.01); *G06F 9/44505* (2013.01); *G06F 9/544* (2013.01);
(Continued)

(58) Field of Classification Search
CPC .............. G06F 3/06; G06F 13/10; G06N 3/06
See application file for complete search history.

(56) References Cited

U.S. PATENT DOCUMENTS

| | | |
|---|---|---|
| 9,280,810 B2 | 3/2016 | Stec et al. |
| 2017/0103299 A1* | 4/2017 | Aydonat .............. G06N 3/0454 |

(Continued)

FOREIGN PATENT DOCUMENTS

| | | |
|---|---|---|
| EP | 1898322 A1 | 3/2008 |
| WO | 2017/032468 A1 | 3/2017 |

(Continued)

OTHER PUBLICATIONS

EPO International Seaching Authority, Partial international Search Report on Patentability / Invitation to Pay Additional Fees, and Where Application, Protest Fee dated Dec. 4, 2018 in International Application No. PCT/EP2018/071046 entitled "A Peripheral Processing Device" filed Aug. 2, 2018, 19 pages.

(Continued)

*Primary Examiner* — David E Martinez
(74) *Attorney, Agent, or Firm* — Lee & Hayes, PC (57) ABSTRACT

A peripheral processing device comprises a physical interface for connecting the processing device to a host computing device through a communications protocol. A local controller connected to local memory across an internal bus provides input/output access to data stored on the processing device to the host through a file system API. A neural processor comprises at least one network processing engine for processing a layer of a neural network according to a network configuration. A memory at least temporarily stores network configuration information, input image information, intermediate image information and output information produced by each network processing engine. The local controller is arranged to receive network configuration information through a file system API write command, to receive input image information through a file system API write command; and to write output information to the local memory for retrieval by the host through a file system API read command.

30 Claims, 8 Drawing Sheets

(51) Int. Cl.
| | |
|---|---|
| *G06F 13/10* | (2006.01) |
| *G06F 9/54* | (2006.01) |
| *G06N 3/04* | (2006.01) |
| *G06F 9/445* | (2018.01) |
| *G06N 3/063* | (2006.01) |
| *G06K 9/00* | (2006.01) |

(52) U.S. Cl.
CPC ........... *G06K 9/00986* (2013.01); *G06N 3/04* (2013.01); *G06N 3/0454* (2013.01); *G06N 3/063* (2013.01); *G06N 3/0481* (2013.01)

(56) References Cited

U.S. PATENT DOCUMENTS

| | | | |
|---|---|---|---|
| 2018/0211155 A1 | | 7/2018 | Bazrafkan et al. |
| 2018/0341495 A1* | | 11/2018 | Culurciello ............ G06N 3/063 |
| 2019/0102671 A1* | | 4/2019 | Cohen ................. G06K 9/6217 |
| 2019/0132334 A1* | | 5/2019 | Johns ...................... G06F 21/56 |
| 2019/0180409 A1* | | 6/2019 | Moloney ................. G06T 15/08 |

FOREIGN PATENT DOCUMENTS

| | | |
|---|---|---|
| WO | 2017/129325 A1 | 8/2017 |
| WO | 2017/129352 A1 | 8/2017 |
| WO | 2017/198861 A1 | 11/2017 |

OTHER PUBLICATIONS

Anonymous: "Movidius Announces Deep Learning Accelerator and Fathom Software Framework", Apr. 28, 2016 (Apr. 28, 2016), XP055526678, Internet—movidius.com DOI: 10.1016/j.giq.2010.02.005 Retrieved from the Internet://www.movidius.com/news/movidius-announces-deep-learning-accelerator-and-fathom-software-framework [retrieved on Nov. 23, 2018] 4 pages.

Anonymous: "Intel Deep Learning Inference Accelerator", Jun. 1, 2017 (Jun. 1, 2017), XP055526650, Retrieved from the Internet: URL:www.intel.com/content/dam/support/us/en/documents/server-products/server-accessories/Intel_DLIAUserGuide_1.0.pdf [retrieved on Nov. 23, 2018] 13 pages.

Anonymous: "io-fs-media Reference", QNX,Jan. 1, 2015 (Jan. 1, 2015), XP055526669, Retrieved from the Internet: URL://www.google.com/url?sa=t&rct=j&q=&esr-c=s&source=web&cd=1&ved=2ahUK3EwjZuJa9reAhWLmLQKHb7PAGAQFjAAegQIAhpAC&url=htt%3A%2F%2Fwww.qnx.com%2Fdownload%d2Fdownload%2F27063%2Fio-fs-mediaReference.pdf&usgA=OvVaw2sqmTPGV5qtmbdbUlx5Qxu [retrieved on Nov. 23, 2018] the whole document.

Asier Arranz: "Low power AI machine learning neural networks: Fathom by Intel and Movidius #CES2017", Jan. 9, 2017 (Jan. 9, 2017), XP055527163, Youtube Retrieved from the Internet: URL www.youtube.com/watch?v=eyjshhd_eMs [retrieved on Nov. 26, 2018].

Sebastian Thorarensen: "A Back-End for the SkePU Skeleton Programming Library targeting the Low-Power Multicore Vision Processor Myriad 2", Jan. 1, 2016 (Jan. 1, 2016), XP055527174, Retrieved from the Internet: URL:www.liu.diva-portal.org/smash/get/diva2:1052541/FULLTEXT01.pdf [retrieved on Nov. 26, 2018]; 46 pages.

Hyperstone GMBH, F4 family of Flash Memory Controllers Diagramme, 1 page.

Dlugosch, P., Brown, D., Glendenning, P., Leventhal, M., and Noyes, H., "An Efficient and Scalable Semiconductor Architecture for Parallel Automata Processing", IEEE Transactions on Parallel and Distributed Systems, vol. 25, No. 12, Dec. 2014, pp. 3088-3098.

Keeton, K., "Memory-Driven Computing", HewlettPackard Enterprise, Oct. 20, 2016, pp. 1-45.

* cited by examiner

PERIPHERAL PROCESSING DEVICE

FIELD

The present invention relates to a peripheral processing device.

BACKGROUND

Figure 1:
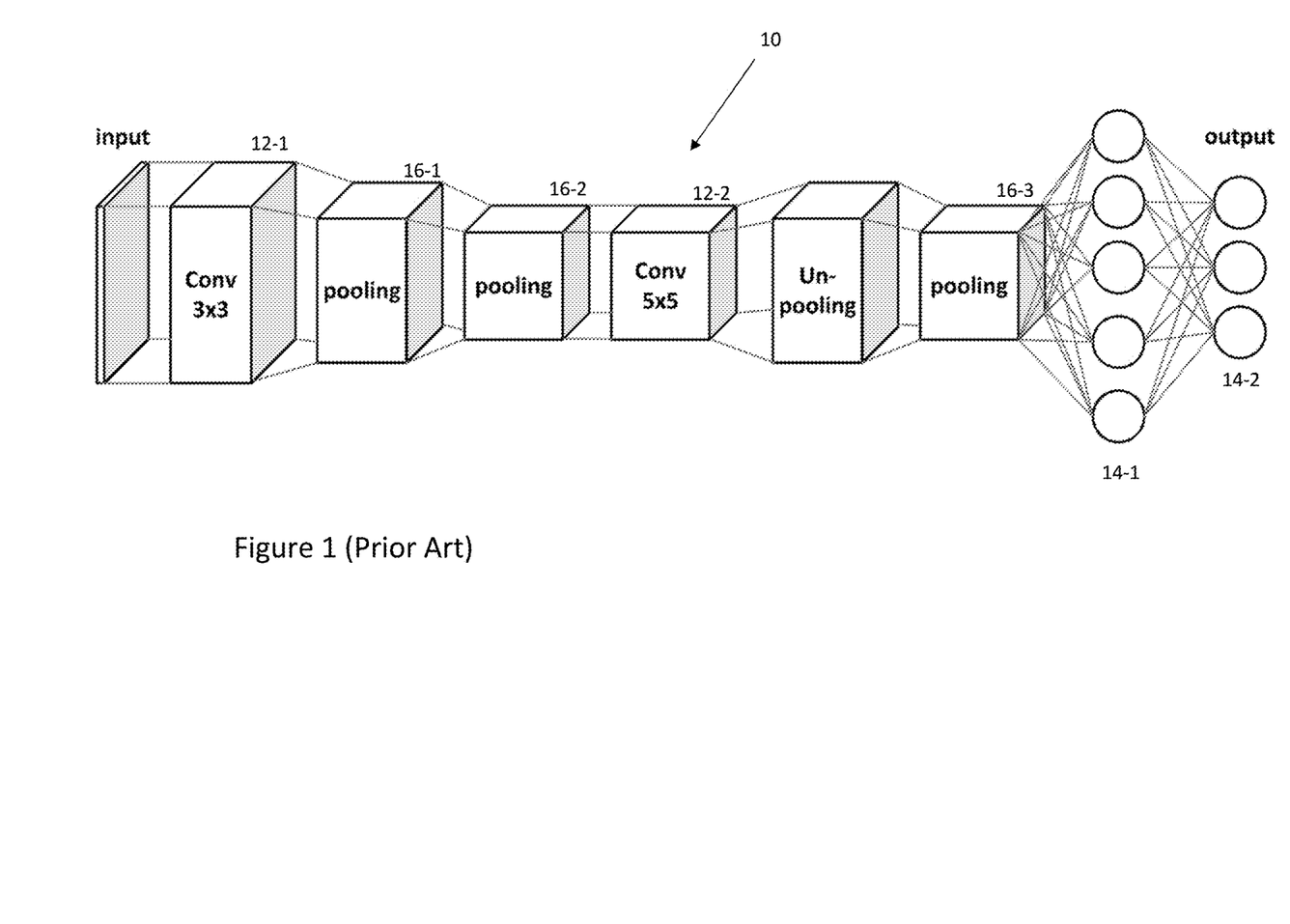
FIG. 1 illustrates a typical CNN.

Referring to FIG. 1, convolutional neural networks (CNNs) 10 usually comprise multiple layers including convolutional layers 21-1, 12-2 or fully connected layers 14-1, 14-2, typically accompanied by pooling 16-1, 16-2, 16-3 or regularization tasks:

A Convolutional Layer convolves, for example, an input image or map "I" (in general nD) with a kernel "W" (in general n+1D) and adds a bias term "b" (in general nD) to it. The output is given by:

$$P = I*W + b$$

where * operator is (n+1)D convolution in general. Typically, n=3, but for time series applications, n could be 4. The convolution output P is then typically passed through an activation function. During training, the kernel and bias parameters are selected to optimize an error function of the network output. Convolution layers are used to create feature maps that, later in the processing chain, are interpreted by fully connected layers. Typically, multiple convolution layers are employed to generate in turn multiple feature maps.

A Fully Connected Layer is similar to classical Neural Network (NN) layers where all the neurons in a layer are connected to all the neurons in their subsequent layer. The neurons give the summation of their input multiplied by their weights and this is then passed through their activation functions.

In the example of FIG. 1, the last fully connected layer 14-2 comprises 3 output neurons, each providing a value for each category of object the network is attempting to identify in an input image (or image window).

Note that fully connected layers can be regarded as a form of convolution layer where the kernel size (width×height×channels) is equal to the size of the (multi-channel) map to which it is applied and for the purposes of simplicity, the term CNN is employed when implementing such layers.

A Pooling Layer applies a (usually) non-linear transform (Note that "average pooling" is a linear transform, but the more popular "max-pooling" operation is non-linear) on an input image to reduce the size of the data representation after a previous operation. It is common to put a pooling layer between two consecutive convolutional layers. Reducing the spatial size leads to less computational load and also prevents over-fitting as well as adding a certain amount of translation invariance to a problem. These layers are particularly important to reduce the complexity of parameters, computation and size of intermediate layers that need to be saved in a temporary memory between layers.

Regularization (not illustrated in FIG. 1) prevents overfitting inside a network. One can train a more complex network (using more parameters) with regularization and prevent over-fitting while the same network would get over-fitted without regularization. Different kinds of regularizations have been proposed including: weight regularization, drop-out technique and batch normalization. Each of them has their own advantages and drawbacks which make each one more suitable for specific applications.

As convolution layers require a lot of multiply-accumulate type of instructions, running CNNs on general purpose processing architectures (e.g. CPU/DSP) requires a large amount of processing power.

In order for modern application processors to support CNNs, there would be a need to: upgrade the memory subsystem (to provide much larger bandwidth); allow for larger power consumption (as a consequence); and upgrade processing power (TFLOPs processing power to run a decent real-time network).

To run the lightest typical object detector network architecture, a given system would need to have roughly one extra LPDDR4 (low power double data rate) 32 bit channel and an upgraded application processor capable to run anywhere from 100 GMACs (equivalent of several quad core ARM Cortex A75) to several TMACs (several tens of ARM Cortex A75 cores).

Figure 2:
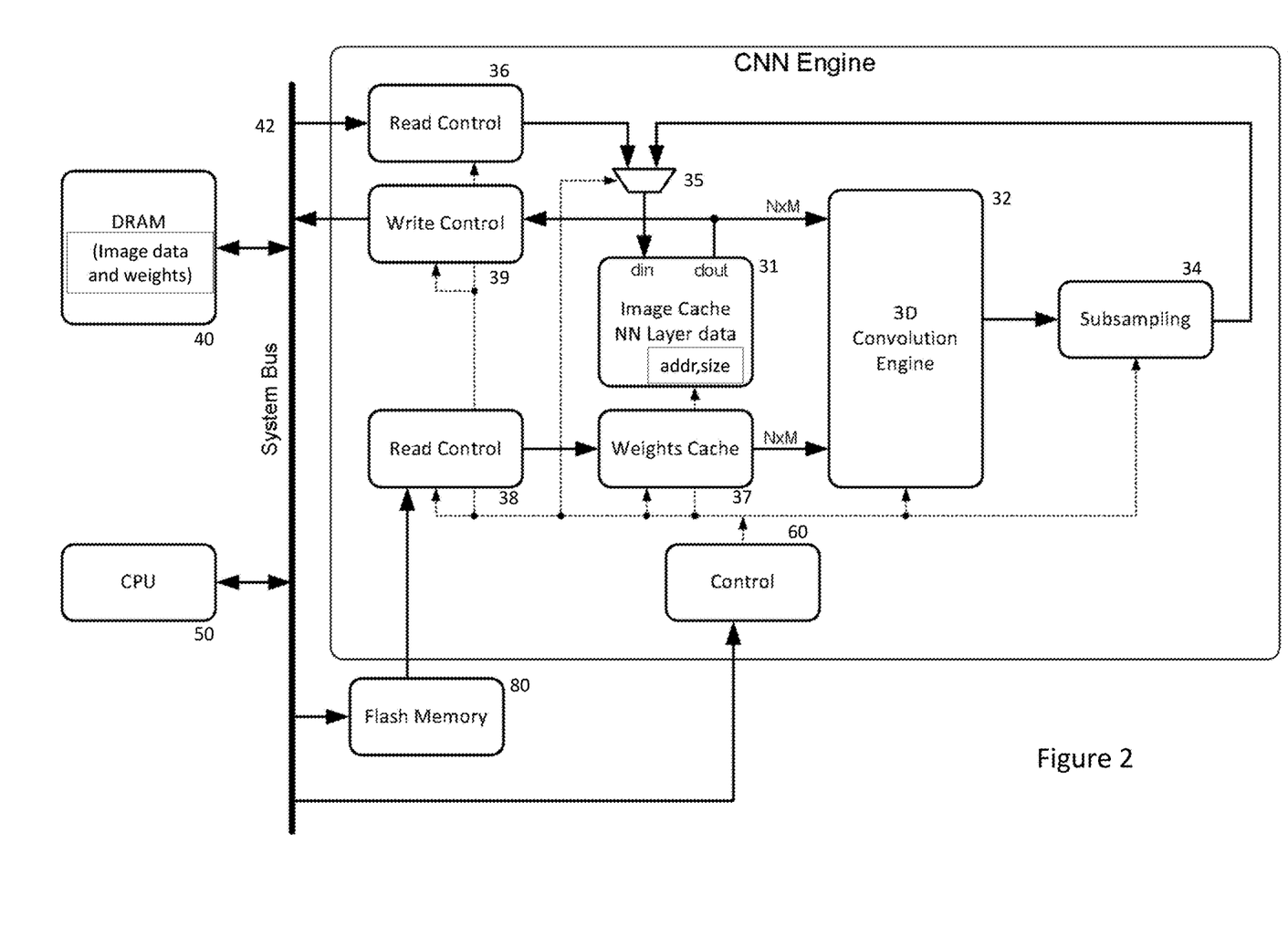
FIG. 2 illustrates a PCNN Processor Architecture disclosed in PCT Publication No. WO 2017/129325.

Referring to FIG. 2, PCT Publication No. WO 2017/129325 (Ref: FN-481-PCT) discloses a programmable CNN (PCNN) engine 30' providing a general purpose neural processor, capable of loading its networks (e.g. equivalent of the program in a traditional CPU) through a separate memory channel 38 from the input image data 36 and results 39. The PCNN is an iterative processor that executes the networks layer by layer. The configuration of the layers, whether specifically convolutional, fully-connected, pooling or un-pooling, the weights types and values and the neuron's activation functions are all programmable via the network definition.

Use of such a processor 30' in conjunction with a separate host processor 50 can reduce the power requirements for a system while enabling the network to operate in real-time on streams of images. However, the engine 30' needs to be integrated within a system at manufacture.

Separately, it has been proposed to move all the logic and temporary memory required by a CNN to a high speed peripheral and build a co-processor with dedicated CNN accelerators and very large local memory bandwidth, for example, the Deep Learning Inference Accelerator (DLIA) from Intel Corporation; or the neural network accelerator on a USB stick provided by Movidius. However, these solutions require host kernel drivers and so are not readily deployed with existing systems.

SUMMARY

According to a first aspect of the present invention there is provided a peripheral processing device according to claim 1.

According to a second aspect of the present invention there is provided a peripheral processing device according to claim 20. Embodiments can be implemented to appear as a storage peripheral that is supported by virtually all operating systems over a standard high speed physical interface, for example, USB, SDIO, SATA, UFS, NVMe, eMMC. (Indeed, embodiments can actually be used as peripheral storage devices.) This ensures that host kernel drivers are not required.

Applications can be distributed on storage provided on the peripheral itself, loaded as required and then executed on request by a host device.

Some embodiments could allow for an out-of-band signalling between the host device and peripheral processing device, although it is appreciated that doing so may require administrator or root privileges for the peripheral device.

BRIEF DESCRIPTION OF THE DRAWINGS

Embodiments of the present invention will now be described, by way of example, with reference to the accompanying drawings, in which.

DESCRIPTION OF THE EMBODIMENTS

Figure 3:
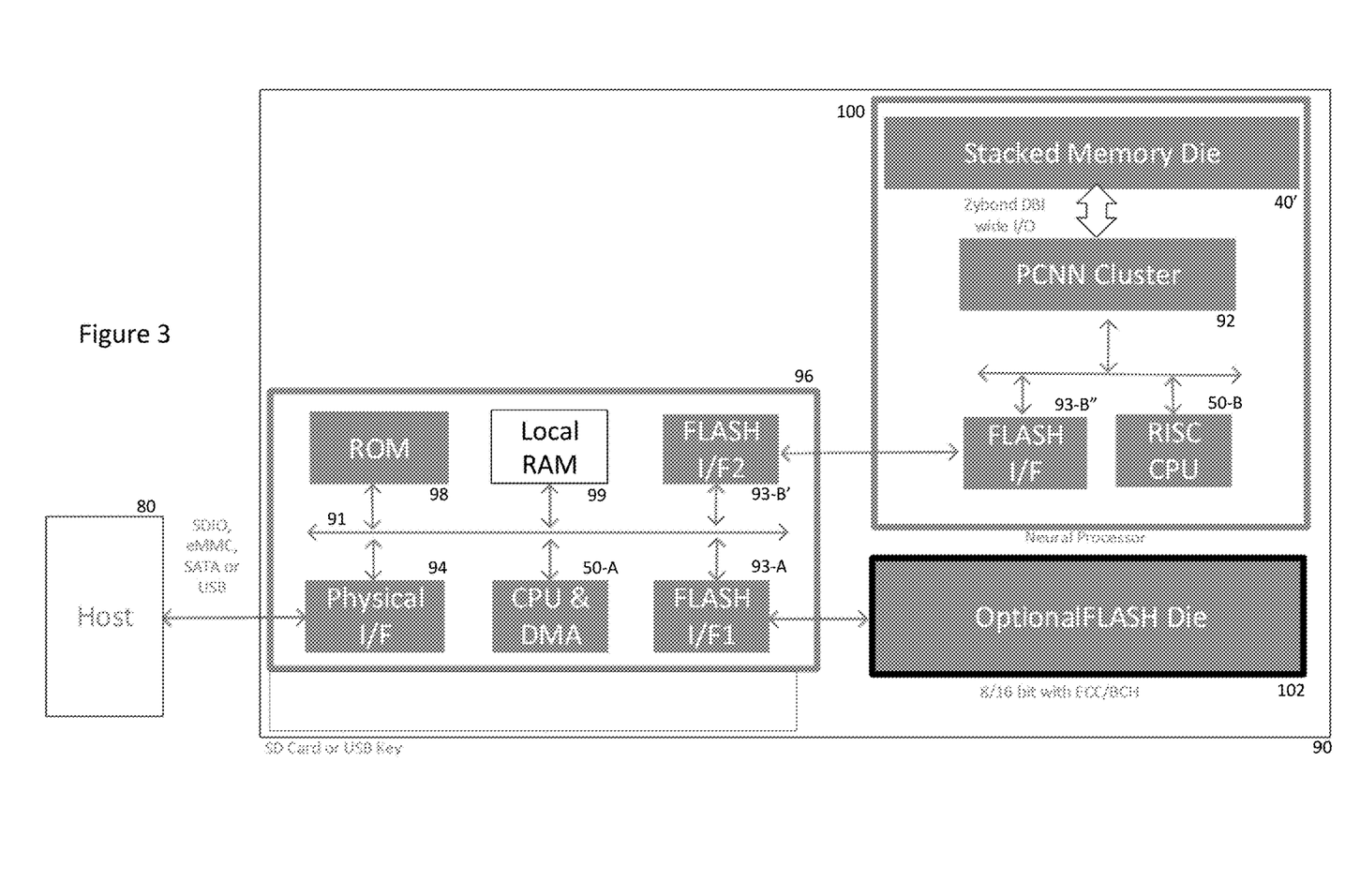
FIG. 3 shows a peripheral processing device according to one embodiment the present invention implemented within a multi-channel off-the-shelf flash controller with modified firmware to remap areas from an SRAM die to files in a host file system space for controlling a PCNN cluster.

Referring now to FIG. 3, embodiments of the present invention comprise a peripheral processing device 90 providing a host 80 access to a cluster of programmable CNNs, 92 using an RPC (Remote Procedure Call) method over a standard file system API (supported by virtually all host systems to which a storage device is attached). The host 80 in this case represents a CPU for a computing device to which the peripheral processing device 90 is connected. As such, the computing device may be any of a smartphone, tablet, laptop computer, desktop computer or indeed bespoke computing device such as a security camera including an SD card slot or USB port or equivalent peripheral connector. The host 80 can comprise one or more separate processors communicating with the peripheral processing device 90 through a peripheral interface 94.

The file system acts as a carrier for input data for the CNNs of the cluster 92 as well as results from the CNNs. The file system is also used by the host 80 to transfer the network data (layer configuration, type, weights, instructions) to the PCNN cluster 92 and to control the operation (start, stop, etc.) of the PCNN cluster 92.

In the embodiment of FIG. 3, the peripheral processing device 90 is implemented in an SD-Card or USB key form factor with a corresponding conventional physical interface 94. Such peripheral storage devices typically comprise a controller portion 96 including a CPU 50-A accessing program memory 98 and volatile memory 99 across a parallel system bus 91. The physical interface 94 converts serial signalling between the peripheral device 90 and the host 80 using any of the conventional protocols including SDIO, eMMC, SATA or USB into parallel data for communication on the bus 91.

In conventional SD-Cards or USB keys, the CPU 50-A reads/writes information from/into flash memory 102 through an interface 93-A while mapping communications from the host 80 to stored information. It is known for such devices to include a dual flash interface so that data may be written/read in parallel into/from flash memory through a pair of interfaces 93-A, 93-B' to speed up host access to the device. An example of such dual channel control is the F4 family of Flash Memory Controllers from Hyperstone GmbH.

In a first embodiment of the present invention, instead of flash memory interfacing with the second flash interface 93-B', a neural processor 100 incorporating the PCNN cluster 92 is accessed through the second flash interface 93-B' and its own counterpart flash interface 93-B", as will be explained in more detail.

The CPU 50-A can now be re-programmed (by updating the contents of ROM 98) so that rather than interleaving memory access between the flash interfaces 93-A and 93-B, its conventional memory I/O is performed through flash interface 93-A only. (Indeed, it will be appreciated that if the peripheral device 90 were not required to operate as a storage device, this function could be avoided completely, thus the designation of the flash die 102 as optional.)

Separately, the CPU 50-A is programmed to respond to designated file system access to write/read information through the second flash interface 93-B to/from a second CPU 50-B within the neural processor 100 as explained generally below.

In one example of such access, communication between the neural processor 100 and the host 80 is as follows:

(i) Upon insertion or connection to the device incorporating the host 80, the SD-CARD or USB key 90 under the control of CPU 50-A provides to the host 80 file system a virtual storage drive with a pre-determined logical directory/file structure in a conventional fashion, for example, as follows:

```
AI-ACC\CNN0\
       \CNN1\
```

As indicated, this file structure can be within a given volume or separate to a volume provided by the device 90 for general purpose storage. Each sub-directory above CNN0, CNN1 . . . corresponds to one CNN of the PCNN cluster 92 (described in more detail below). Thus, the number of such entries corresponds with the number of concurrent CNNs that can be executed by the neural processor 100.

(ii) Each CNN directory entry (e.g. CNN0) in turn has a directory/file structure for: data input, data output, network configuration and control streams, for example as follows:

```
AI-ACC\CNN0\datain
            \dataout
            \network
            \ctl
```

The above datain, dataout, network and ctl entries can be implemented as either single files, archives of one or more files or sub-directories or any combination thereof.

(iii) Thus the host 80 can use a standard file API, fwrite( ), to write a network configuration into one or more files in the CNNxx\network file or sub-directory.

(iv) Separately, the host 80 prepares data for processing, for example, an image or images, and writes the image(s) to one or more files in the CNNxx\datain file or sub-directory, again using the standard fwrite( ) function.

(v) Once the data is written, the host 80 writes a start byte into a file in the CNNxx\ctl file or sub-directory, to indicate to the neural processor 100 that it should start execution on CNNxx\datain input data with the CNNxx\network definition, passing in the process all required information about the data input (e.g. type of data and characteristics).

(vi) The host 80 can optionally read a file in CNNxx\ctl to determine the expected output (e.g. size, data type, etc.).

(vii) In any case, in order to avoid several applications trying to access same CNN, file opening may be set as an exclusive operation with the host 80 blocking read/writes from CNNxx\directories, while waiting for the results of the processing to take place.

(viii) Upon return, the results from the neural processor 100 will be available in the host system CNNxx\dataout file or sub-directory.

The implementation of FIG. 3 requires the minimal re-engineering of a conventional peripheral storage device to implement the invention as it requires only the re-programming of the CPU 50-A and the replacement of a flash memory chip with a dedicated chip based on the architecture described in PCT Publication No. WO 2017/129325 (Ref: FN-481-PCT).

Figure 4:
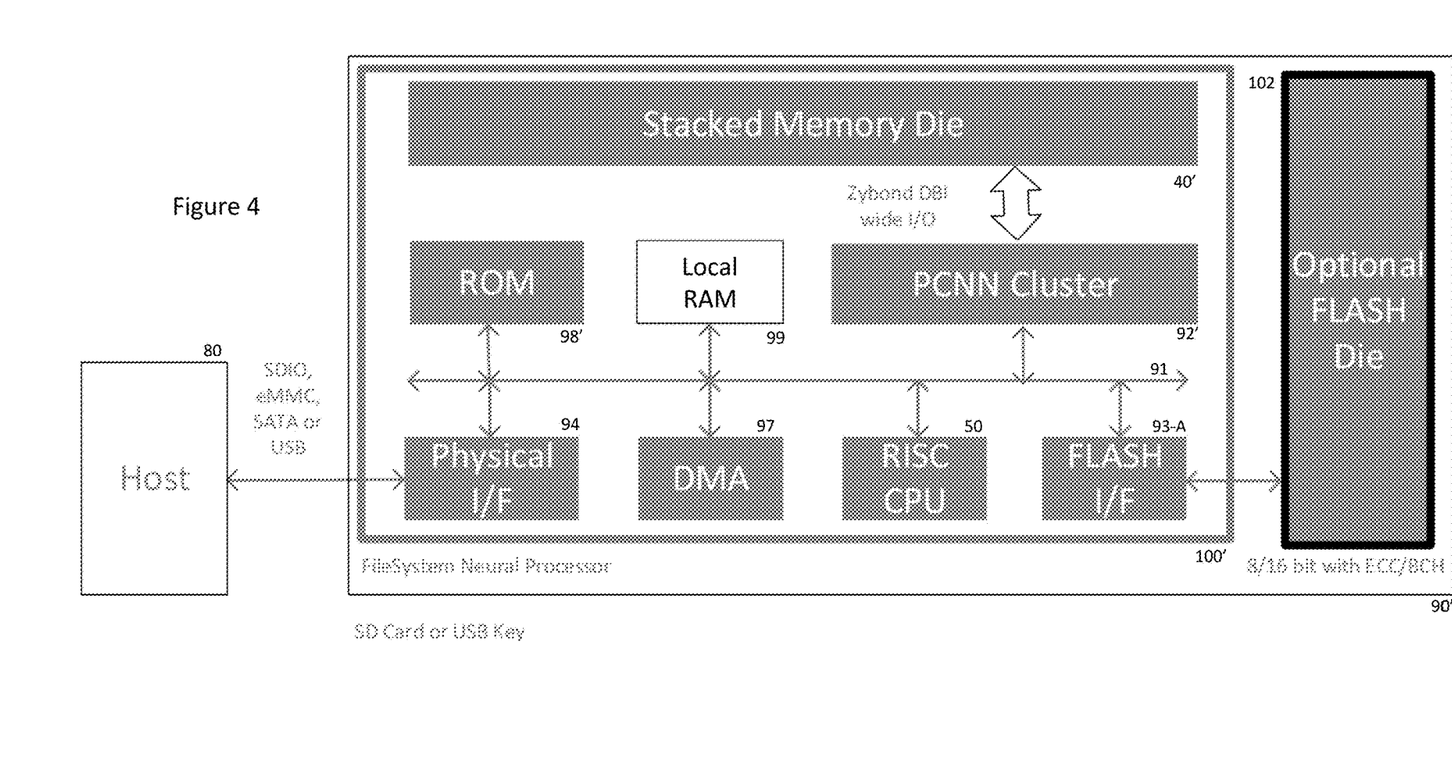
FIG. 4 shows a peripheral processing device according to a second embodiment of the present invention implemented as a dedicated neural processor with optional flash storage.

Referring now to FIG. 4, on the other hand the controller 96 and neural processor 100 can be merged into a single dedicated neural processor 100' with optional flash storage 102.

In this case, the second flash interface 93-B has been completely replaced and the CPU 50 now provides more direct control of the PCNN cluster 92'. In FIG. 4, the DMA function of the CPU 50-A of FIG. 3 is shown offloaded onto a separate module 97, however, its function remains generally the same as in FIG. 3. Again, the original flash interface 93-A and die 102 can be maintained, if the device 90' is to provide general purpose storage. Nonetheless, where provided, implementing standard flash storage within the neural processor 100' itself may reduce manufacturing costs.

In each of the embodiments of FIGS. 3 and 4, the CPU 50; 50-A,50-B act in a manner analogous to the host CPU 50 of FIG. 2 in that whether via the dedicated flash interface 93-B, as in FIG. 3, or more directly, as in FIG. 4, the CPU 50; 50-A,50-B controls the image information supplied to the CNNs of the PCNN cluster 92 as well as their configuration and handles the results provided from the PCNN cluster 92.

Figure 5:
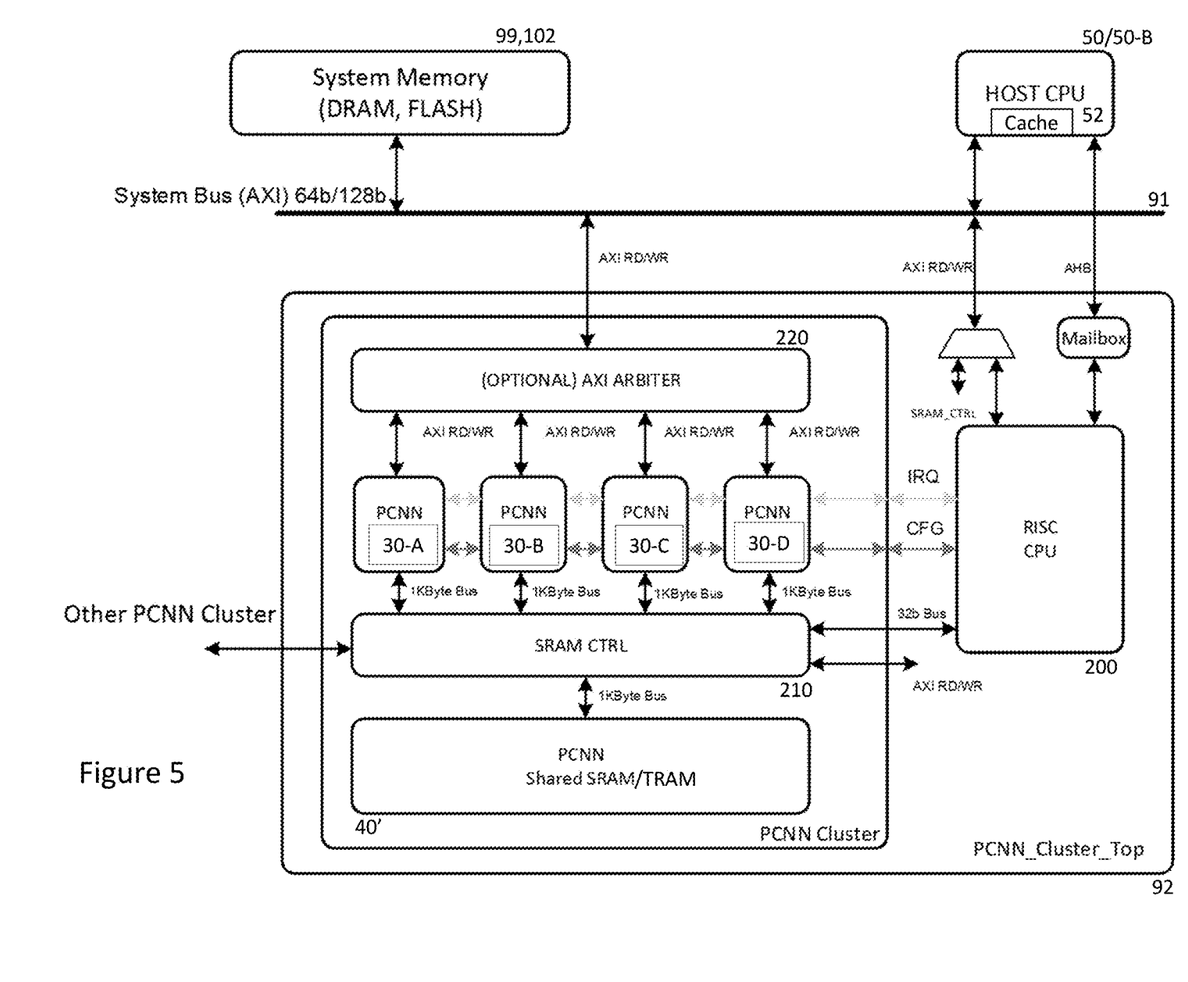
FIG. 5 shows in more detail an exemplary architecture for the PCNN cluster of FIGS. 3 and 4.

Referring now to FIG. 5, which illustrates an exemplary PCNN cluster 92 in more detail. The cluster 92 includes its own CPU 200 which communicates with the host CPU 50; 50-B resident on the device. In the embodiment, the cluster includes a number, in this case 4, of independently programmable CNNs 30-A . . . 30-D of the type shown in FIG. 2. Note that within the PCNN cluster 92, the individual CNNs 30 do not have to be the same and for example, one or more CNNs might have different characteristics than the others. So for example, one CNN may allow a higher number of channels to be combined in a convolution than others and this information would be employed when configuring the PCNN accordingly. In the embodiment, however, each CNN 30-A . . . 30-D, rather than operating principally using either system memory 99, 102 instead uses a shared memory 40'. Thus, the host CPU 50; 50-B in conjunction with the cluster CPU 200 and a memory controller 210 arrange for the transfer of initial image information as well as network configuration information from the either the memory 99, 102 into the shared memory 40'. In order to facilitate such transfer, the host CPU 50/50-A, 50B can incorporate some cache memory 52.

Figure 6:
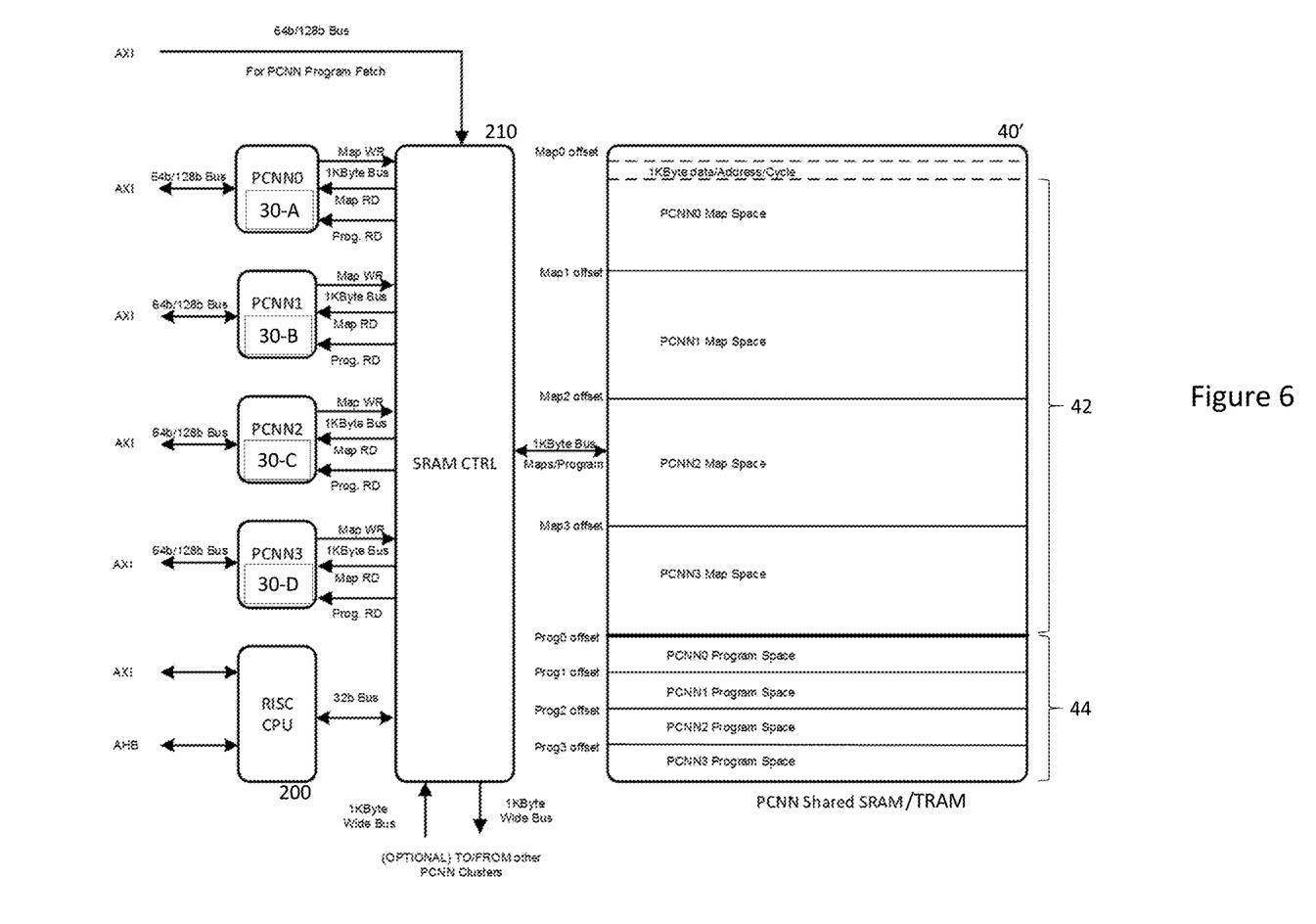
FIG. 6 shows in more detail the memory arrangement for the PCNN cluster of FIG. 5.

As will be seen in FIG. 6, the shared memory 40' can be divided into a number of different spaces comprising image/map spaces 42 for each PCNN 30-A . . . 30-D of the cluster as well as program spaces 44 comprising the network configuration for each PCNN 30-A . . . 30-D of the cluster.

From the point of view of the PCNN cluster 92, the system operates as follows:

1. The host controller 80 in conjunction with the device CPU 50/50-A,50-B and PCNN CPU 200 loads neural network configuration and weights from memory (not shown) into shared memory 40' either: via the peripheral system memory 99, if the information has been dynamically generated by the host 80; or from FLASH memory 102, if the information is pre-stored. As will be appreciated, network configuration information need only be written from the host controller side every time a network/algorithm needs to be changed/initialized and so this should be less frequent than the rate at which images are being processed.

2. The host controller 80 in conjunction with the device CPU 50/50-A,50-B and PCNN CPU 200 loads input image (s) via the peripheral system memory 99 into shared memory 40'. This information is most likely dynamically generated by the host 80 and so not stored as a file in FLASH memory 102—but it is nonetheless possible that some applications running on the host 80 might draw initial image information from files pre-stored in flash memory 102.

3. The registers for the controller within each PCNN 30-A . . . 30-D are configured according to the neural network program and weights addresses in shared memory 40' and in accordance to the image(s) or map(s) to be processed by the PCNN.

4. The required PCNN 30-A . . . 30-D can now be enabled and once enabled, the controller within any enabled PCNN reads input maps from shared system memory 40' in accordance with its register settings and processes the maps as specified by the neural network program. Intermediate maps may be stored locally within each CNN 30-A in an image cache 31 as disclosed in PCT Publication No. WO 2017/129325 (Ref: FN-481-PCT) or temporarily in system memory 40' at configurable addresses.

5. After the processing is completed, the results are written to the system memory 40'.

6. The PCNN switches to idle mode and issues an interrupt to the PCNN CPU 200.

7. The PCNN CPU 200 can now write information back to the host CPU 50/50-B so that this can be written to the appropriate \CNNxx\dataout file or sub-directory. The CPU 50/50-A can now notify the host 80 that results are available for further processing as required.

While transfer of information between system memory 99 or flash memory 102 can be channelled through the host CPU 50/50-A,50-B, it is also possible to provide each PCNN 30-A . . . 30-D within a cluster with access to the system bus 91 via a common arbiter 220.

Implementations such as illustrated in FIG. 5 are capable of processing 30 to 60 frames/second as long as the data in/out transfer does not exceed the bandwidth available over the physical interface 94.

Figure 7:
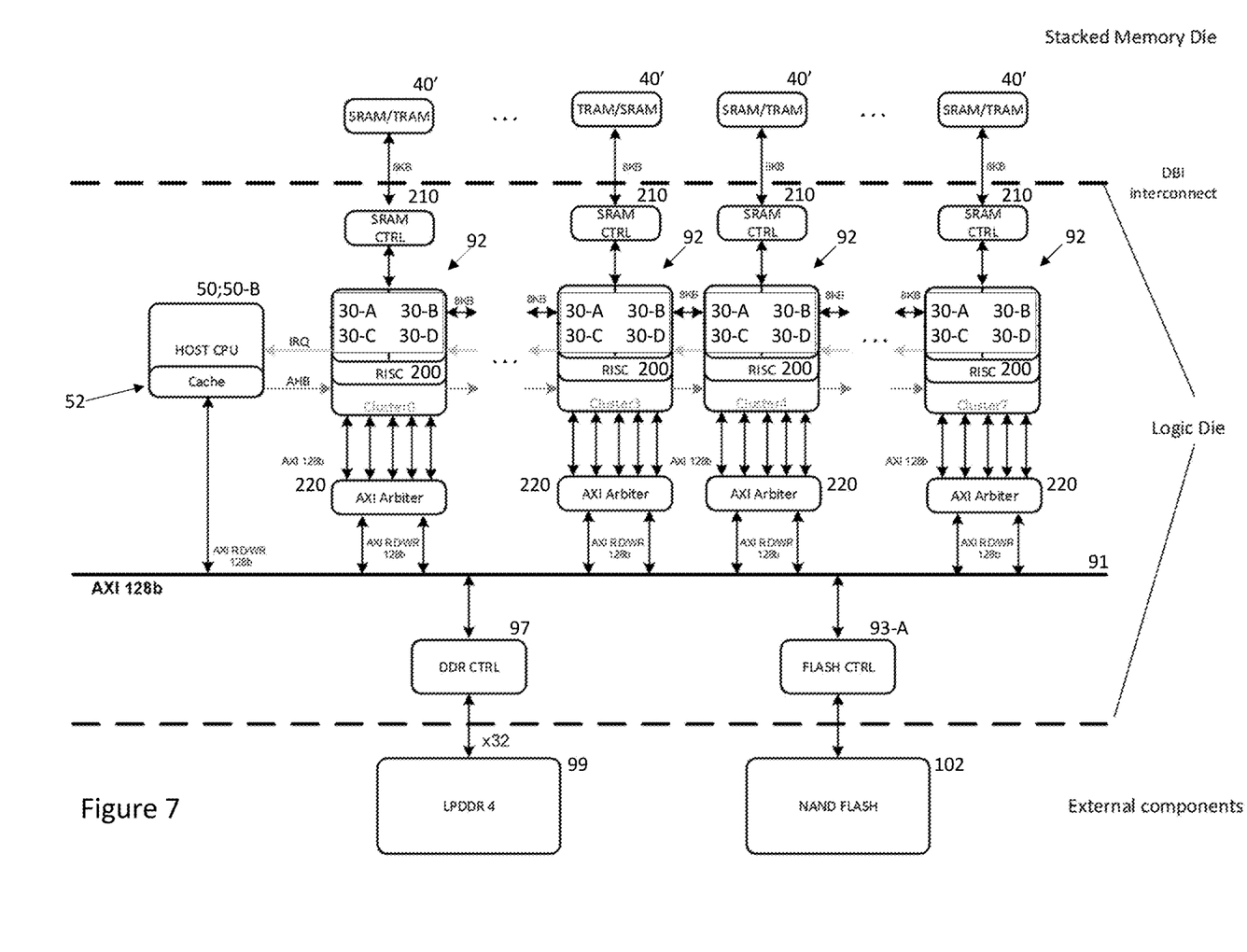
FIG. 7 illustrates how embodiments may be implemented with a stacked die architecture.

Referring to FIG. 7 and as indicated in FIGS. 5 and 6, it is possible to daisy chain PCNN clusters under the control of a given host CPU 50/50-A,50-B in cooperation with local RISC PCNN CPU 200. Providing such a large number of individually programmable CNN's (for example, in this case 4×8=32) can be particularly useful for enabling the processing of networks comprising multiple different layers. Examples of such networks are discussed in co-pending U.S. application Ser. No. 15/413,283 entitled "A method for synthesizing a neural network" filed 23 Jan. 2017 (Ref: FN-604-US), the disclosure of which is incorporated herein by reference. Nonetheless, conventional compilers, based on Caffe, Tensorflow, Torch, Theano, MatConvNet, etc. can be used to design networks which can be distributed over the several PCNN cores and clusters shown in FIG. 7.

The daisy chained clusters can intercommunicate under the control of the CPU 50/50-A,50-B and the local PCNN CPUs 200 so that the results of processing by one CNN within a given cluster 92 can be communicated through the SRAM controller 210 for further processing by another CNN in either the same or another cluster 92, without the need to re-program the network configuration for any given CNN. Alternatively, the architecture can be employed to implement completely separate processing networks allowing the neural processor 100, 100' to operate in multiple modes in order to accommodate either object filtering applications or object detection and recognition applications, for example, operating:

(i) independent (small) networks on the same image data;
(ii) independent (small) networks on different image data; or
(iii) a (large) network on same image data.

As explained in PCT Publication No. WO 2017/129325 (Ref: FN-481-PCT), whether single core or multi-core, as shown in FIG. 7, intermediate layer values (feature maps) can be written either to back to main memory 99, especially where AXI access via an arbiter 220 is available, or to the local shared memory 40'.

As indicated in FIG. 7, the architecture of the devices 90, 90' can be implemented with stacked die. Methods for stacking such die include ZiBond and DBI from Invensas, a Tessera company and these provide 3D Wafer/Die Bonding Solutions enabling wafer-to-wafer, die-to-wafer or die-to-die bonding and interconnection. Thus, the logical modules comprising the host 50/50-B, memory interfaces 93-A,97 and PCNN clusters (to an extent) can be implemented on one die with shared memory 40' being implemented on one or more further die. So for example, the shared memory 40' can be implemented either as:

(i) SRAM only—storing both the network configuration and the intermediate layer data;
(ii) A combination of SRAM (to hold the network configuration) and TRAM (Transient RAM, to hold the intermediate layer data);
(iii) TRAM only—only the intermediate layer data will be stored here with the network configuration information being fetched by the PCNN CPU 200 from the local optional flash memory 102. This could provide a more compact system as the FLASH density generally exceeds that of SRAM.

TRAM as described in PCT Publication No. WO 2017/129325 (Ref: FN-481-PCT) comprises memory implemented with single transistor cells where the charge for each programmed cell is stored in either parasitic transistor or substrate capacitance. Such cells enable a charge to be applied to a bit of memory, but the memory array including such cells does not require circuitry for refreshing the memory, as in conventional DRAM.

Again, internal memory 31, 37 for the individual CNNs of the clusters 92 could also be implemented with separate die. In any case, separate memory die can employ different technology node than one another or the logic die. So while the logic die can be designed using highest density technology (e.g. 10 n), the memory die can be designed using cheaper technology (e.g. 28 n).

It is worth noting about the above described implementations that the file system doesn't guarantee immediate read/writes and so the file system will try to cache/delay read/writes as much as possible. Neither does the file system guarantee the order of writes to different files (again due to caching).

It will be appreciated that the PCNN cluster 92 and stacked memory die 40' find utility in many fields. In particular, because the architecture illustrated in FIGS. 5-7 is extensible to include a large number of PCNNs 30, each capable of serving as a respective core or group of cores for a neural network dedicated for a specific task, the architecture finds utility in the automotive sector where driver monitoring systems (DMS) are increasingly being required to perform tasks including, for example: Face Detection & Tracking, Face Features Detection, Face & Iris Recognition, Eye Opening & Gaze, Fatigue & Drowsiness, Age, Gender, Emotions, Vital Sign Detection, Pose Invariant Body Detection & Segmentation, Body Posture Detection, Depth, Gesture Detection as well as Generic Object Detection. A device using neural networks to provide all of this functionality might require 20 or so cores and using the core architecture described in relation to FIGS. 5-7, these cores or groups of cores can operate independently of one another or can share processing results through the map space in memory 40'. Again, using a DBI interconnect enables a large number of interconnections, significantly greater than 10K, to be provided between the PCNN clusters 92 and memory 40' without the cost, space or power requirements of providing pin or wire bond connections between the PCNN clusters 92 and memory. On the other hand, simple stacking of other die to the DBI bonded processor/memory stack, for example, CCD sensors, MEMS devices can also be achieved using Zibond techniques, with inter die connections being made using wire bonds.

Figure 8:
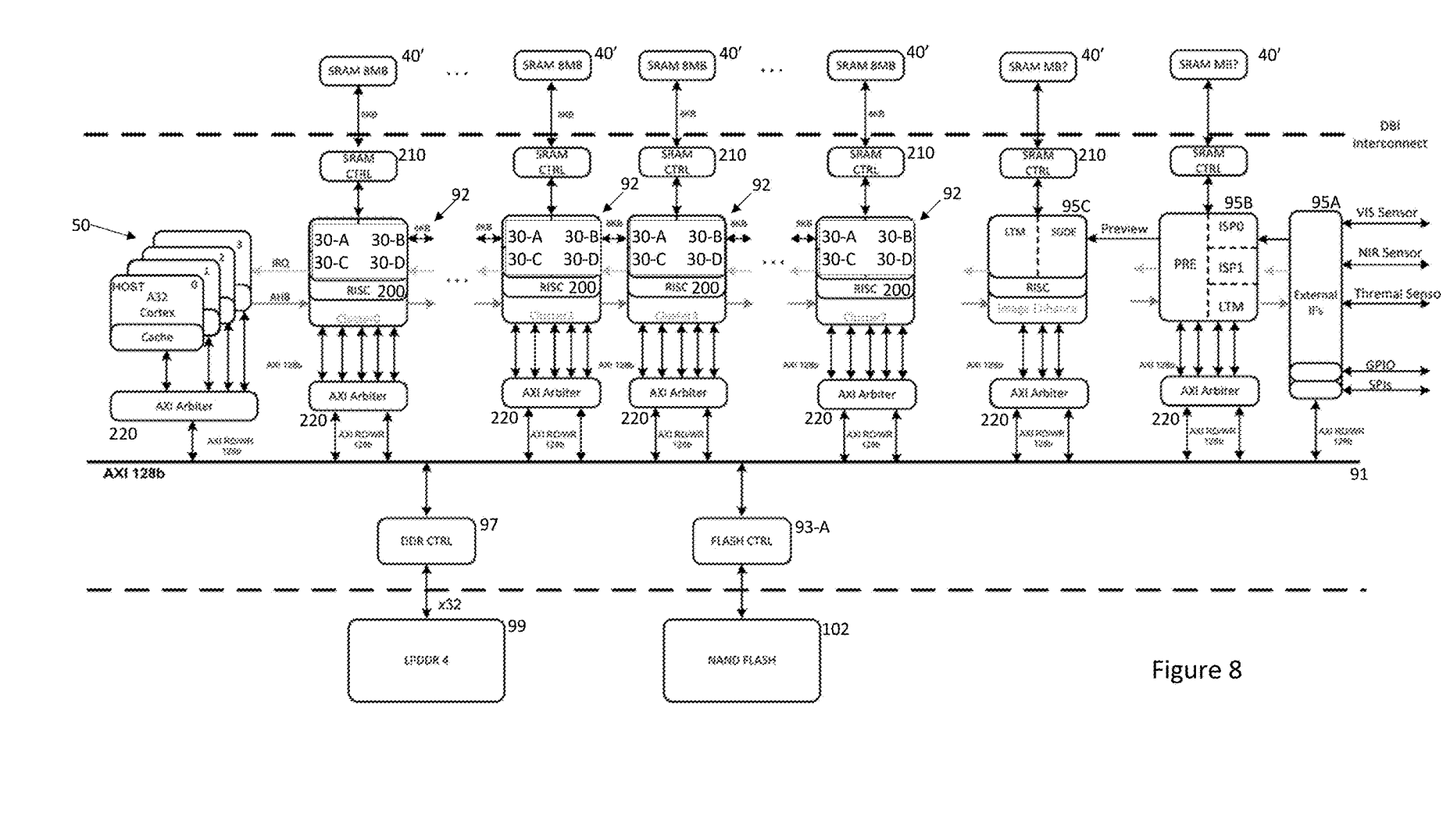
FIG. 8 shows a further embodiment of the peripheral processing device especially useful in automotive applications.

Referring now to FIG. 8, a multi-processor neural network engine includes a bank of host processors 50 which can each independently control each of the PCNN clusters 92 through a common internal Advanced High-performance Bus (AHB), with an interrupt request (IRQ) interface used for signalling from the PCNN cluster 92 back to the host processors 50, typically to indicate completion of processing, so that, as described for the embodiment of FIGS. 5-7, each of the host processors 50 can coordinate the configuration and operation of the PCNN clusters 92.

An external interface block 95A with one or more serial peripheral interfaces (SPIs) enables the host processors 50 to connect to other processors within a vehicle network (not shown) and indeed a wider network environment as described above for the embodiment of FIGS. 5-7. Thus, one or more of the host processors 50 can be made accessible to external processors using a file system API, and so also appear as a non-volatile storage for such external processors for accessing information in NAND Flash memory 102. Nonetheless, in other implementations, in addition or as an alternative to processors being accessible through a file system API and more akin to the CPU 50 disclosed in PCT Publication No. WO 2017/129325 (Ref: FN-481-PCT), one or more of the host processors 50 can operate as general purpose processors exposing an API common to external processors in a vehicle network, for example, a CAN Bus API. Communications between such host processors 50 and external processors can be provided either through the SPIs or through a general purpose input/output (GPIO) interface, possibly a parallel interface, also provided within the block 95A.

The external interface block 95A also provides a direct connection to various image sensors including: a conventional camera (VIS sensor), a NIR sensitive camera, and a thermal imaging camera. As will be appreciated, each of these forms of image find utility in neural network processing with visible wavelength images—both monochrome/intensity and colour—being useful for face detection and tracking, NIR images being useful for iris detection and recognition, and thermal imaging being useful for head pose estimation as well as the other applications mentioned above. Note that the fields of view of these cameras do not need to be coincidental and indeed an NIR camera providing images to be used for iris detection/recognition might have a might more specific field of view than a thermal camera providing images to be used for pose estimation. For applications, particularly those concerned with the environment external to a vehicle, still further types of image sensors could also be employed for example, a LIDAR image sensor or RADAR image sensor indeed the image sensors could also be supplemented with signals from microwave sensors.

The system further includes a dedicated image signal processor (ISP) core 95B including a pair of pipelines ISP0, ISP1. A local tone mapping (LTM) component within the core 95B can perform basic pre-processing on received images including for example: re-sampling the images; generating HDR (high dynamic range) images from combinations of successive images acquired from the image acquisition devices; generating histogram information for acquired images—see PCT Application No. PCT/EP2017/062188 (Ref: FN-398-PCT 2) for information on producing histogram of gradients; and/or producing any other image feature maps which might be used by PCNN clusters 92 during image processing, for example, Integral Image maps—see PCT Application WO2017/032468 (Ref: FN-469-PCT) for details of such maps. The processed images/feature maps can then be written to shared memory 40' where they are either immediately or eventually available for subsequent processing by the PCNN clusters 92 as well as or alternatively, providing received pre-processed image information to a further distortion correction core 95C for further processing or writing the pre-processed image information to memory 99 or 102 possibly for access by external processors.

The distortion correction engine core 95C includes functionality such as described in U.S. Pat. No. 9,280,810 (Ref: FN-384-CIP) for flattening distorted images for example those acquired by wide field of view (WFOV) cameras, such as in-cabin cameras. The core 95C can operate either by reading image information temporarily stored within the core 95B tile-by-tile as described in U.S. Pat. No. 9,280,810 (Ref: FN-384-CIP) or alternatively, distortion correction can be performed while scanning raster image information provided by the core 95B. Again, the core 95C includes an LTM component so that the processing described in relation to the core 95B can also be performed if required on distortion corrected images.

Also note that in common with the PCNN clusters 92, each of the cores 95B and 95C has access to non-volatile storage 102 and memory 99 via a respective arbiter 220 and volatile memory 40' through respective SRAM controllers 210.

The above described architecture provides a device which can receive and provide image information to other processors within a network, such as a vehicle network, as well as process and provide the processing results to such other processors within the network. Implementing the system using stacked wafer functionality enables the system to be deployed at a cost making such functionality feasible within a vehicle network.

Note that while the above described embodiments have been described in terms of comprising serial interface between the processing device and any external processor, it is also possible to provide an implementation using, for example, Parallel ATA (PATA) interface and/or compact flash interface.

Still further variants are also possible. So for example, in the implementation of both FIGS. 5-7 and 8, it is possible for the host processor(s) 50 to not alone control and figure the operation of the PCNN clusters, but also to execute general purpose programs themselves. In order to do so, the host(s) can make use of any unused space within the shared memory 40'.

It will also be appreciated that providing a processing device with a number of PCNN clusters 92, not alone provides extensive neural processing power, but the device can also be re-configured as required. Thus, a given cluster 92 which has been dedicated to implementing one form of neural network, for example, face detection, can be readily shifted to another cluster. This makes the system particularly robust to manufacturing or operating faults. Thus, if any PCNN cluster 92 is found to be defective at any stage after manufacture, the host(s) 50 can take this into account in determining on which cluster 92 to implement neural processing.

Note that as the shared memory 40' is also accessible by the host(s) 50, see the AXI connections of FIG. 5-6, any region of shared memory 40' not being used by any de-commissioned cluster can be re-purposed for use by the host(s). In one case where this could be especially useful, the host(s) 50 can be programmed as required to perform general purpose programming using either dedicated and/or any space freed up in shared memory 40' due to any de-commissioned cluster—perhaps using image information or information output from other PCNN clusters 92 or host 50 in shared memory 40'.

Noting that the shared memory 40', when incorporated in a die stacked on a processing die is far cheaper to provision than LPDDR4 memory 99, especially in the implementation of FIG. 8, the LPDDR4 memory 99 can be much reduced in size or even eliminated completely in favour of shared memory 40'.

Finally, it will be understood that the weight and configuration information used within the PCNN clusters 92 can be the result of extensive a priori training and perhaps based on large data sets which can have involve significant resources to assemble and label. For this reason, it can be desirable to protect such information when deployed in memory using cryptographic techniques. So for example, weight and/or configuration information can be encrypted using key information specific to a device so that if such information were copied from the memory of a given device, it could not then be deployed in another device. This along with any other securing methods and systems can be used to protect this information from unauthorised access by $3^{rd}$ parties.

The invention claimed is:

1. A peripheral processing device comprising:
   a physical interface for connecting said processing device to a host computing device through a communications protocol;
   a local controller connected to local memory across an internal bus and being arranged to provide input/output access to data stored on said peripheral processing device to said host computing device through a file system application programming interface, API;

a neural processor comprising at least one network processing engine for processing a layer of a neural network according to a network configuration;

a memory for at least temporarily storing network configuration information for said at least one network processing engine, input image information for processing by one of said at least one network processing engine, intermediate image information produced by said at least one network processing engine and output information produced by said at least one network processing engine, said local controller being arranged to receive said network configuration information for each network processing engine through a file system API write command;

said local controller being arranged to receive said input image information for processing by said neural processor through a file system API write command; and said local controller being arranged to write said output information to said local memory for retrieval by said host computing device through a file system API read command.

2. A peripheral processing device according to claim 1 wherein said layer is any of a convolutional layer, a fully connected layer, a pooling layer, an un-pooling layer or a regularization layer.

3. A peripheral processing device according to claim 1 comprising a dual channel flash memory controller, said neural processor being accessed by said local controller through one of said two flash memory channels.

4. A peripheral processing device according to claim 3 further comprising on-board flash memory accessed by said local controller through the other of said two flash memory channels.

5. A peripheral processing device according to claim 1 comprising one of an SD Card or a USB key.

6. A peripheral processing device according to claim 1 wherein said physical interface comprises one of: SDIO, NVMe, eMMC, SATA, UFS or USB interfaces.

7. A peripheral processing device according to claim 1 further comprising on-board flash memory.

8. A peripheral processing device according to claim 7 wherein neural network configuration information for said neural processor is stored in said on-board flash memory.

9. A peripheral processing device according to claim 1 wherein at least a portion of said memory is incorporated in one or more die stacked on a die incorporating logic for said local controller.

10. A peripheral processing device according to claim 9 wherein said memory comprises a combination of SRAM and TRAM die.

11. A peripheral processing device according to claim 1 wherein said neural processor comprises a cluster of network processing engines sharing said memory and a common controller, said common controller being arranged to communicate with said local controller to read input image information for processing by one of said at least one network processing engine into said shared memory and to write output information produced by said at least one network processing engine from said shared memory to said local memory.

12. A peripheral processing device according to claim 11 comprising a plurality of clusters of network processing engines configured to configurably provide intermediate image information to one another through said shared memory.

13. A peripheral processing device according to claim 11, wherein each network processing engine corresponds with a logical directory in said file system, and wherein said file system write and read commands read and write information for a given network processing engine to and from a corresponding logical directory.

14. A peripheral processing device according to claim 13 wherein information for each network processing engine is stored in either sub-directories and/or files with a directory corresponding to a network processing engine.

15. A peripheral processing device according to claim 1 further comprising respective interfaces for one or more image acquisition devices, the device being arranged to write image information acquired from such image acquisition devices to said memory.

16. A peripheral processing device according to claim 15 wherein said one or more image acquisition devices comprise any combination of: visible wavelength, infra-red wavelength, thermal imaging, RADAR or LIDAR cameras.

17. A peripheral processing device according to claim 15 further comprising a distortion correction core arranged to receive image information from said image acquisition devices and to write distortion corrected image information to said memory.

18. A peripheral processing device according to claim 1 comprising a bank of local controllers, at least one of said controllers being arranged to provide input/output access to data stored on said peripheral processing device to an external computing device through a non-file system application programming interface, API.

19. A vehicle network comprising a peripheral processing device according to claim 18 wherein said non-file system application programming interface, API is a vehicle network API.

20. A peripheral processing device comprising:

a physical interface for connecting said processing device to at least one host computing device through a communications protocol;

at least one local controller connected to local memory across an internal bus and being arranged to provide input/output access to data stored on said peripheral processing device to said host computing device through an application programming interface, API;

a neural processor comprising a plurality of network processing engines, each for processing a layer of a neural network according to a network configuration;

a memory for at least temporarily storing network configuration information for said network processing engines, input image information for processing by one of said network processing engines, intermediate image information produced by said network processing engines and output information produced by said network processing engines, wherein said at least a portion of said memory is incorporated in one or more die stacked on a die incorporating logic for said at least one local controller; and respective interfaces for one or more image acquisition devices, said one or more image acquisition devices comprising any combination of: visible wavelength, infra-red wavelength, thermal imaging, RADAR or LIDAR cameras, the device being arranged to write image information acquired from such image acquisition devices to said memory, wherein said plurality of network processing engines comprises a plurality of clusters of network processing engines configured to configurably provide intermediate image information to one another through said memory.

21. A peripheral processing device according to claim 20 further comprising on-board flash memory.

22. A peripheral processing device according to claim 21 wherein neural network configuration information for said neural processor is stored in said on-board flash memory.

23. A peripheral processing device according to claim 20 wherein said memory comprises a combination of SRAM and TRAM die.

24. A peripheral processing device according to claim 20 further comprising a distortion correction core arranged to receive image information from said image acquisition devices and to write distortion corrected image information to said memory.

25. A peripheral processing device according to claim 20 wherein at least one of said at least one local controller is arranged to execute a general purpose program for processing information stored in said memory.

26. A peripheral processing device according to claim 20 wherein network configuration information for said network processing engines is securely stored in said memory in a manner preventing use of said network configuration information in another device.

27. A peripheral processing device according to claim 20 wherein said local memory is one of: LPDDR memory or memory incorporated in one or more die stacked on a die incorporating logic for said at least one local controller.

28. A vehicle network comprising a peripheral processing device according to claim 20 and a network connecting said peripheral processing device to at least one host computing device.

29. A peripheral processing device comprising:
a physical interface for connecting said processing device to at least one host computing device through a communications protocol;
at least one local controller connected to local memory across an internal bus and being arranged to provide input/output access to data stored on said peripheral processing device to said host computing device through an application programming interface, API;
a neural processor comprising a plurality of network processing engines, each for processing a layer of a neural network according to a network configuration;
a memory for at least temporarily storing network configuration information for said network processing engines, input image information for processing by one of said network processing engines, intermediate image information produced by said network processing engines and output information produced by said network processing engines, wherein said at least a portion of said memory is incorporated in one or more die stacked on a die incorporating logic for said at least one local controller; and
respective interfaces for one or more image acquisition devices, said one or more image acquisition devices comprising any combination of: visible wavelength, infra-red wavelength, thermal imaging, RADAR or LIDAR cameras, the device being arranged to write image information acquired from such image acquisition devices to said memory,
wherein said at least one local controller is responsive to detecting that one of said network processing engines is defective for configurably re-deploying neural network processing from said defective processing engine to another of said network processing engines.

30. A peripheral processing device according to claim 29 wherein a local controller arranged to execute a general purpose program is arranged to utilise space in said memory originally allocated to a defective network processing engines.

* * * * *